United States Patent
Shi et al.

(10) Patent No.: US 9,369,620 B2
(45) Date of Patent: Jun. 14, 2016

(54) CAMERA WITH BUILT-IN POLAROID SWITCHING MECHANISM

(75) Inventors: Xiudong Shi, Shanghai (CN); Yinghai Yu, Shanghai (CN)

(73) Assignee: SHANGHAI RUISHI MACHINE VISION TECHNOLOGY CO., LTD., Shanghai (CN)

( * ) Notice: Subject to any disclaimer, the term of this patent is extended or adjusted under 35 U.S.C. 154(b) by 49 days.

(21) Appl. No.: 14/372,577

(22) PCT Filed: Jul. 16, 2012

(86) PCT No.: PCT/CN2012/078679
§ 371 (c)(1),
(2), (4) Date: Jul. 16, 2014

(87) PCT Pub. No.: WO2013/107166
PCT Pub. Date: Jul. 25, 2013

(65) Prior Publication Data
US 2015/0002730 A1     Jan. 1, 2015

(30) Foreign Application Priority Data

Jan. 19, 2012  (CN) .......................... 2012 1 0017895
Jan. 19, 2012  (CN) .......................... 2012 2 0026278

(51) Int. Cl.
*H04N 5/225* (2006.01)
*H04N 5/232* (2006.01)
*G03B 11/00* (2006.01)
*G03B 17/00* (2006.01)
*G02B 7/00* (2006.01)

(52) U.S. Cl.
CPC ................ *H04N 5/2254* (2013.01); *G02B 7/00* (2013.01); *G03B 11/00* (2013.01); *G03B 17/00* (2013.01); *H04N 5/2251* (2013.01); *H04N 5/2252* (2013.01); *H04N 5/23245* (2013.01)

(58) Field of Classification Search
USPC ......................................................... 348/360
See application file for complete search history.

(56) References Cited

U.S. PATENT DOCUMENTS

| 7,663,690 | B2 * | 2/2010 | Kurosawa | ............ | H04N 5/2354 348/224.1 |
| 7,990,459 | B2 * | 8/2011 | Takizawa | ............. | H04N 5/2254 348/241 |
| 8,582,020 | B2 * | 11/2013 | Hoshikawa | ............ | G03B 17/14 348/360 |
| 2002/0044212 | A1 * | 4/2002 | Hashimoto | .......... | H04N 5/2254 348/335 |

(Continued)

*Primary Examiner* — Shahbaz Nazrul
(74) *Attorney, Agent, or Firm* — Global IP Services; Tianhua Gu

(57) ABSTRACT

The invention discloses a camera with a built-in polaroid switching mechanism, including a polaroid switching mechanism and a camera body, wherein a front end of the camera body is provided with a front cover, the front cover is provided with a light aperture, the polaroid switching mechanism is located behind the front cover and inside the camera body, behind the polaroid switching mechanism is provided a CCD image sensor, which directly faces the light aperture and fixes onto a CCD circuit board, a rear end of the CCD image sensor is bonded with a heat sink, and the camera body is further internally equipped with a main circuit board electrically connected with the CCD circuit board. In the invention, the polaroid switching mechanism is integrated inside the camera, thereby facilitating to reduce the volume of the switching mechanism and the camera. Moreover, the built-in design of the polaroid switching mechanism isolates an integral structure from the outside, thereby delaying the aging of plastic parts in the switching mechanism and solving the problem of dust prevention of a polaroid.

8 Claims, 4 Drawing Sheets

(56) References Cited

U.S. PATENT DOCUMENTS

| | | | |
|---|---|---|---|
| 2005/0083431 A1* | 4/2005 | Tsutsumi | H04N 4/2254 348/360 |
| 2009/0161003 A1* | 6/2009 | Takahashi | G02B 26/007 348/360 |
| 2009/0167921 A1* | 7/2009 | Mogi | G03B 17/14 348/333.11 |
| 2012/0050605 A1* | 3/2012 | Nidaira | G02B 5/005 348/360 |

* cited by examiner

CAMERA WITH BUILT-IN POLAROID SWITCHING MECHANISM

CROSS REFERENCE TO RELATED PATENT APPLICATION

The present application is the US national stage of PCT/CN2012/078679 filed on Jul. 16, 2012, which claims the priorities of the Chinese patent applications No. 201210017895.0 filed on Jan. 19, 2012 and Chinese patent applications No. 201220026278.2 filed on Jan. 19, 2012, which applications are incorporated herein by reference.

BACKGROUND OF THE PRESENT INVENTION

1. Field of Invention

The invention relates to a camera, and particularly to a camera with a polaroid switching mechanism.

2. Description of Related Arts

When using a camera to shoot scenes, especially shoot reflective objects, e.g. reflective metal and glass surfaces and the like, it is need to add a polaroid to obtain clearer images. As for a camera, it is need to set a polaroid switching mechanism. When a camera needs a polaroid, the polaroid can be automatically added to an imaging optical path via the switching mechanism; while a polaroid is not needed, the polaroid also can be moved away via the switching mechanism, so the polaroid switching mechanism can realize the switching between a visible light filter and a polarized light filter.

That polaroids (or polaroid switching mechanisms) of existing cameras are placed outside lens results in complex integral structure of the cameras, thereby reducing system reliability and increasing maintenance workload for system fault; and since polaroids are placed outside lens, the size of polaroids are needed to match object lens or even larger, such that switching mechanisms are bulky and difficult to mount.

SUMMARY OF THE PRESENT INVENTION

The technical problems to be solved of the present invention is to provide a camera with a built-in polaroid switching mechanism, so as to overcome the above disadvantages in the prior art.

In order to solve the above technical problems, the invention employs the following technical solutions: a camera with a built-in polaroid switching mechanism, includes a polaroid switching mechanism and a camera body, a front end of the camera body is provided with a front cover, the front cover is provided with a light aperture, the polaroid switching mechanism is located behind the front cover and inside the camera body, behind the polaroid switching mechanism is provided a CCD image sensor, which directly faces the light hole and fixes onto a CCD circuit board, a rear end of the CCD image sensor is bonded with a heat sink, the camera body is further internally equipped with a main circuit board, which is electrically connected with the CCD circuit board.

Preferably, the camera body is an enclosed box composed of a U-shaped base, a top cover, a rear cover and the front cover.

Preferably, the polaroid switching mechanism includes a sliding seat and a drive device, the front cover is provided with a sliding groove, the sliding seat is fixedly mounted with at least one polaroid, the sliding seat has a driving side and a sliding side, which are parallel to each other, and the driving side is provided with a rack meshed with an output gear of the drive device; the sliding side is parallel and opposite to a first side wall of the sliding groove, the first side wall of the sliding groove is equipped with an elastic guide rail, and the elastic guide rail is in sliding fit with the sliding side and exerts pushing force onto the sliding side.

More preferably, the drive device is a micromotor, an output shaft of the micromotor is fixedly mounted with the output gear.

More preferably, the elastic guide rail is an elastic strip wire including a line segment and curved sections at two ends, and the curved sections at two ends are fixed onto the front cover.

More preferably, the front cover is provided with two U-shaped grooves, and the curved sections at two ends of the elastic strip wire are fixed in the two U-shaped grooves.

More preferably, the sliding side is provided with a guide groove, which is in sliding fit with the line segment of the elastic strip wire.

More preferably, on the sliding seat is further fixedly mounted an upper cover plate, and a light filter is located between the upper cover plate and the sliding seat.

More preferably, the sliding seat is provided with a clamping slot, the upper cover plate is provided with a clamping claw to clamp the clamping slot.

Compared to the prior art, the invention has the following beneficial effects: since the polaroid switching mechanism is integrated inside the camera, a polaroid just needs to match eye lens, therefore the area of the polaroid is much smaller than that of an external structure, thereby facilitating to reduce the volume of the switching mechanism and the camera. Moreover, the built-in design of the polaroid switching mechanism isolates an integral structure from the outside, thereby delaying the aging of plastic parts in the switching mechanism and solving the problem of dust prevention of the polaroid.

BRIEF DESCRIPTION OF THE DRAWINGS

The invention is to be further described in detail with reference to the drawings and particular embodiments.

DETAILED DESCRIPTION OF THE PREFERRED EMBODIMENTS

Figure 1:
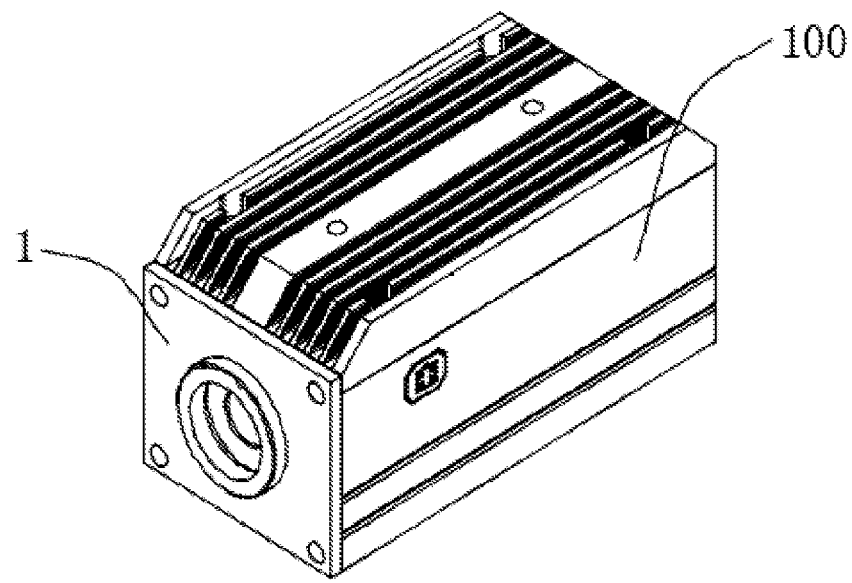
FIG. 1 is a schematic outside view of a camera with a built-in polaroid switching mechanism of the invention.

As shown in FIG. 1, a camera with a built-in polaroid switching mechanism of the invention includes an enclosed box shaped camera body 100, a front end of the camera body 100 is provided with a front cover 1.

Figure 2:
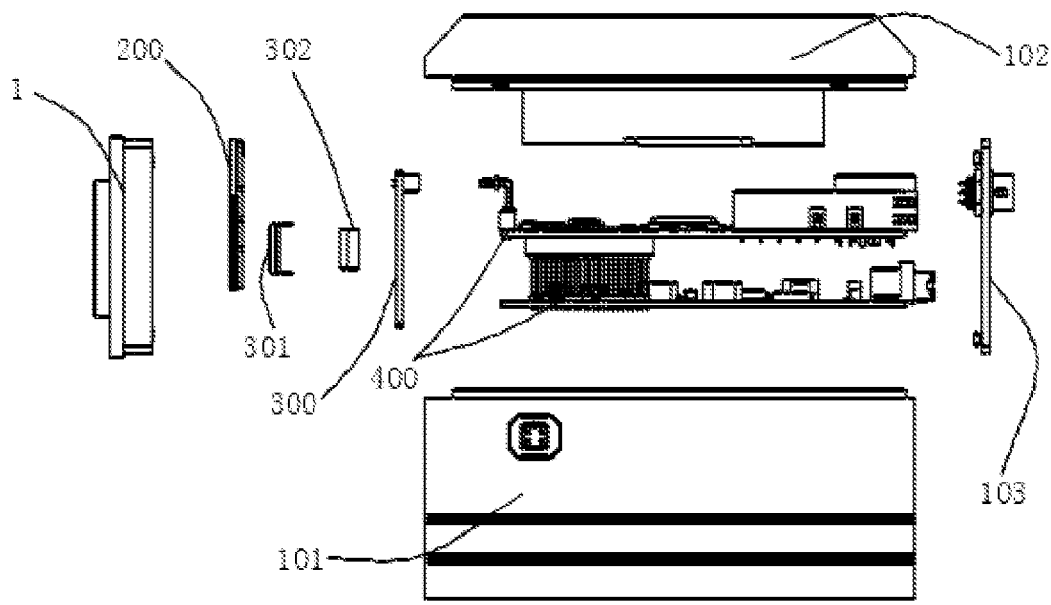
FIG. 2 is a schematic structural exploded view of a camera with a built-in polaroid switching mechanism of the invention.
Figure 3:
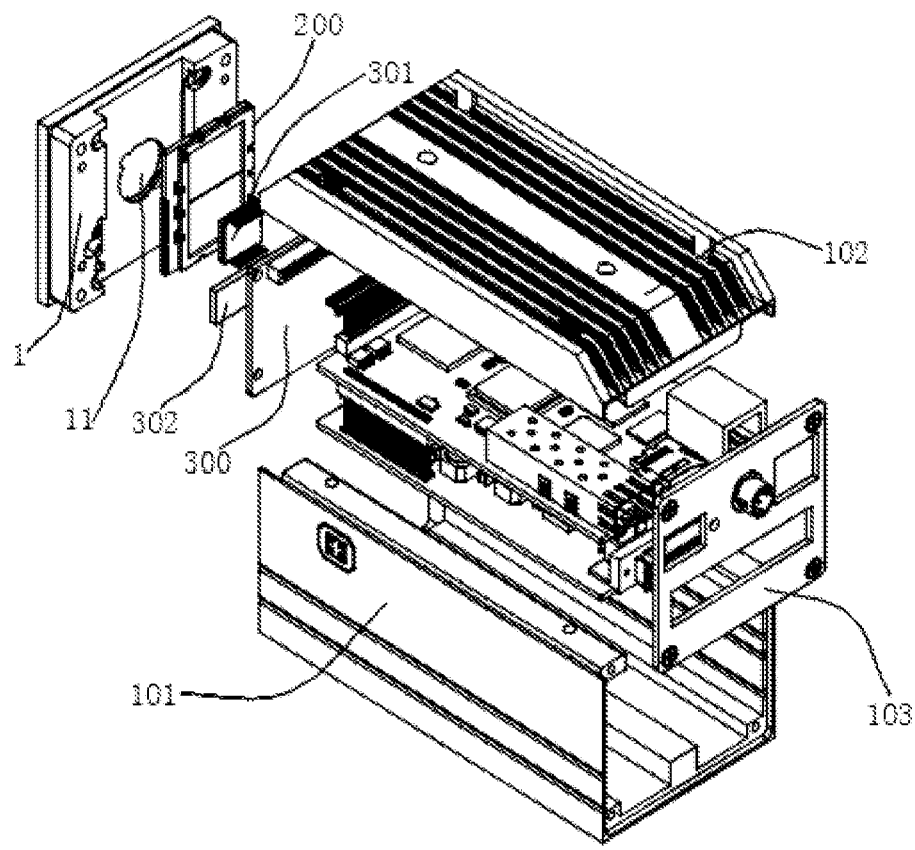
FIG. 3 is a schematic perspective exploded view of a camera with a built-in polaroid switching mechanism of the invention.

As shown in FIGS. 2 and 3, the camera body is composed of a U-shaped base 101, a top cover 102, a rear cover 103 and the front cover 1. The camera body is internally provided with a polaroid switching mechanism 200, a CCD image sensor 301, a CCD circuit board 300, a main circuit board 400 and the like. The front cover 1 is provided with a light aperture 11, the polaroid switching mechanism 200 is located behind the front cover 1, and behind the polaroid switching mechanism 200 is provided the CCD image sensor 301, which directly faces the light aperture 11 and fixes onto the CCD circuit board 300. The CCD circuit board 300 is electrically connected with the main circuit board 400. A rear end of the CCD image sensor 301 is further bonded with a heat sink 302 to facilitate heat dissipation.

A front face of the front cover 1 is used for mounting lens, thus the polaroid switching mechanism in the invention is arranged between the lens and the CCD sensor, which is quite different from the prior art that a polaroid switching mechanism is added in front of lens.

Figure 4:
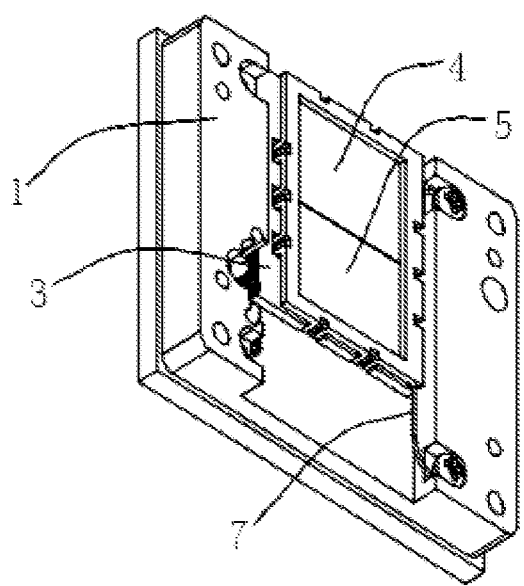
FIG. 4 is a perspective assembly view of a polaroid switching mechanism in the invention.
Figure 5:
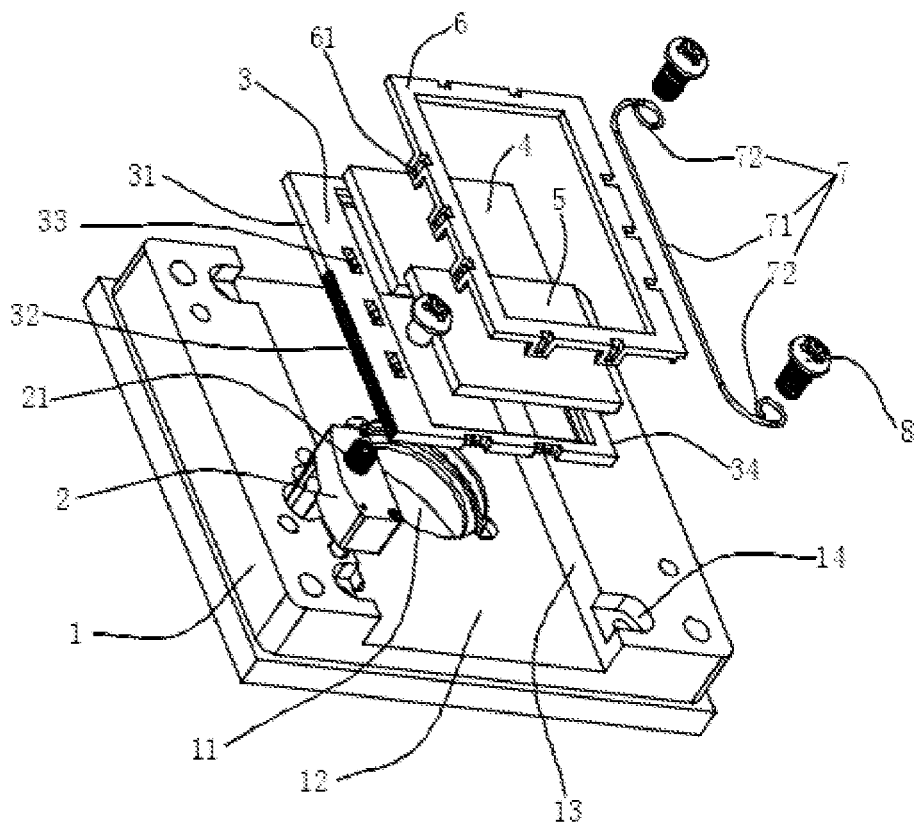
FIG. 5 is a schematic structural exploded view of a polaroid switching mechanism in the invention.

As shown in FIGS. 4 and 5, the front cover 1 is provided with a sliding groove 12 and the light aperture 11 is arranged at the bottom of the sliding groove 12. The polaroid switching mechanism includes a sliding seat 3 and a drive device 2, wherein the sliding seat 3 generally takes the shape of a rectangular frame, and fixedly mounts at least one different polaroid 4, 5 (either one polaroid+light filter, or one light filter only). The sliding seat 3 has a driving side 31 and a sliding side 34, which are parallel to each other. The driving side 31 is provided with a rack 32, which meshes with an output gear 21 of the drive device 2. In the embodiment, the drive device 2 is a micromotor and the output gear 21 is fixedly mounted on an output shaft of the micromotor.

In order to fix the polaroids 4, 5, an upper cover plate 6 may be fixedly mounted on the sliding seat 3, and the polaroids 4, 5 are pressed between the upper cover plate 6 and the sliding seat 3. In order to dismount or mount the upper cover plate 6 more conveniently, the upper cover plate 6 and the sliding seat 3 may use snap connection, i.e. the sliding seat 3 is provided with a clamping slot 33, the upper cover plate 6 is provided with a clamping claw 61, and the clamping claw 61 can be inserted into the clamping slot 33 to realize snap connection.

The sliding side 34 of the sliding seat 3 is parallel and opposite to a first side wall 13 of the sliding groove 12. The first side wall 13 is equipped with an elastic guide rail 7, which is in sliding fit with the sliding side 34 and exerts pushing force onto the sliding side 34. The elastic guide rail 7 can be realized in many ways, for example, by adding spring support at a back face of a movable rigid guide rail. In a preferred embodiment of the invention, the elastic guide rail 7 is an elastic strip wire, the elastic strip wire 7 includes a line segment 71 and curved sections 72 at two ends. The front cover 1 is provided with two U-shaped grooves 14, and the curved sections 72 at two ends of the elastic strip wire are respectively fixed in the two U-shaped grooves 14 via screws 8. Further, the sliding side 34 may be provided with a guide groove, and the line segment 71 of the elastic strip wire is inserted into and in sliding fit with the guide groove. It is apparent that the guide groove may be located at a side of the sliding seat 3 or at a side of the upper cover plate 6, or at a junction between the upper cover plate 6 and the sliding seat 3, all of which shall be considered as that the guide groove is located on the sliding side 34.

The operating principle of the polaroid switching mechanism of the invention is to be described below.

Figure 6:
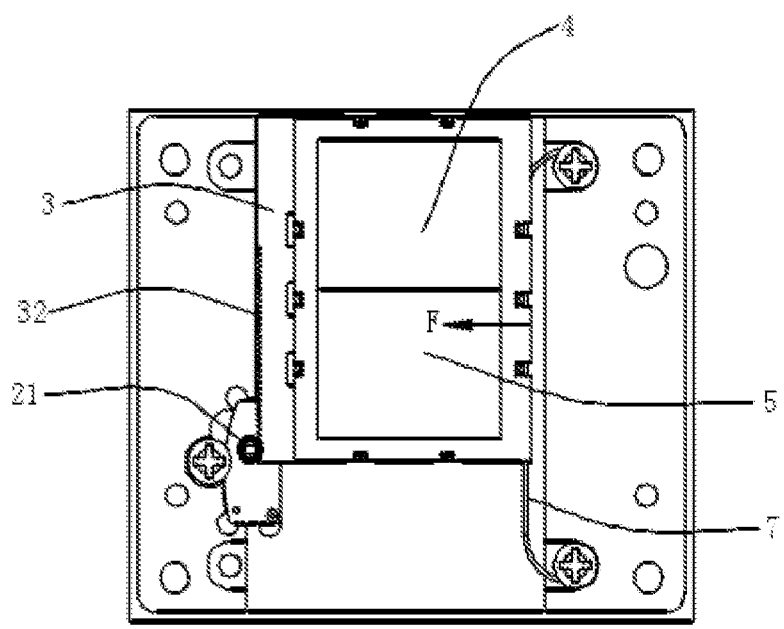
FIG. 6 is a schematic view of a state before a switching action of the polaroid switching mechanism in the invention.
Figure 7:
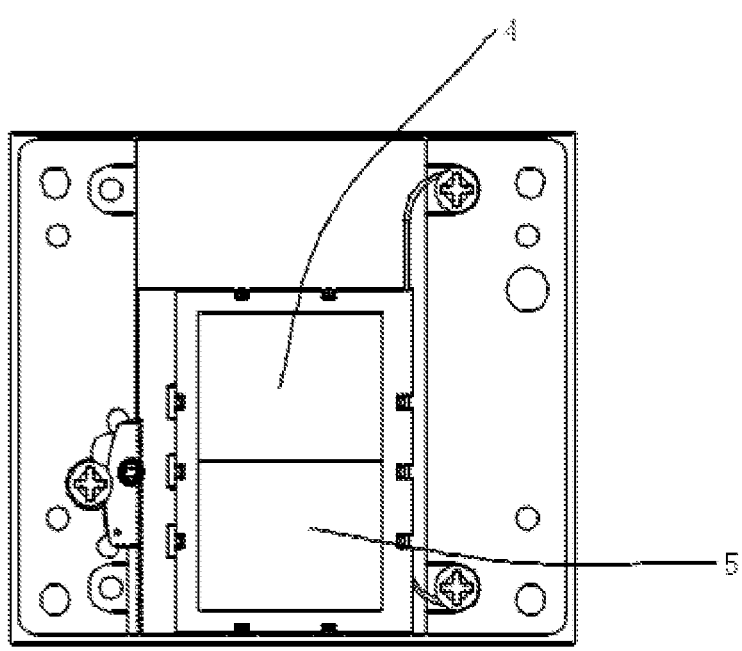
FIG. 7 is a schematic view of a state after a switching action of the polaroid switching mechanism in the invention.

As shown in FIG. 6, under a working state, the sliding seat 3 is at an upper limit position where the polaroid 5 is opposite to the light aperture on the front cover, thereby realizing a light filtering effect. The elastic strip wire 7 exerts pushing force F onto the sliding side 3, such that the sliding side 3 is fastened and positioned at the limit position, which prevents the sliding side 3 from undesirable shift caused by vibration and the like. When the polaroid is unnecessary, the drive device drives the output gear 21 for rotation, thereby driving the rack 32 and the sliding side 3 to slide down. In a sliding process, the elastic strip wire 7 may function to guide until the sliding side 3 reaches a lower limit position, as shown in FIG. 4. At the time, the polaroid 5 is moved away from a position opposite to the light aperture, thereby realizing the switching of the polaroid.

When in use, the elastic strip wire 7 allows close engagement and good driving between the rack 32 and the output gear 21; and after using for a period of time, if wear is produced between the rack 32 and the output gear 21, a gap between the rack 32 and the output gear 21 can be automatically eliminated under the elastic force of the elastic strip wire 7, thereby ensuring close contact and good driving between the rack 32 and the output gear 21.

The invention can be used in a camera for switching a polaroid in the presence of glare to obtain clearer photos. The polaroid switching mechanism is controlled by an internal program of the camera, which can realize automatic switching by simple setting. The invention can automatically eliminate the wear gap caused by long-term use and is suitable for various image sensors with different imaging area. The polaroid switching mechanism of the invention can ensure that the polaroid is fitted tightly without shaking in a cavity formed by the sliding seat and the upper cover plate; and the polaroid switching mechanism of the invention has a smaller volume, which is more beneficial for reducing the volume of the camera.

What is claimed is:

1. A camera with a built-in polaroid switching mechanism, including a polaroid switching mechanism (200) and a camera body (100), a front end of the camera body (100) is provided with a front cover (1), the front cover (1) is provided with a light aperture (11), characterized in that, the polaroid switching mechanism (200) is located behind the front cover (1) and inside the camera body (100), behind the polaroid switching mechanism (200) is provided a CCD image sensor (301), which directly faces the light aperture (11) and fixes onto a CCD circuit board (300), a rear end of the CCD image sensor (301) is bonded with a heat sink (302), and the camera body (100) is further internally equipped with a main circuit board (400), which is electrically connected with the CCD circuit board (300); wherein the polaroid switching mechanism includes a sliding seat (3) and a drive device (2), the front cover (1) is provided with a sliding groove (12), the sliding seat (3) is fixedly mounted with at least one polaroid (4, 5), the sliding seat (3) has a driving side (31) and a sliding side (34), which are parallel to each other, and the driving side (31) is provided with a rack (32) meshed with an output gear (21) of the drive device; the sliding side (34) is parallel and opposite to a first side wall (13) of the sliding groove, the first side wall (13) of the sliding groove is equipped with an elastic guide rail (7), and the elastic guide rail (7) is in sliding fit with the sliding side (34) and exerts pushing force onto the sliding side (34).

2. The camera according to claim 1, characterized in that, the camera body (100) is an enclosed box composed of a U-shaped base (101), a top cover (102), a rear cover (103) and the front cover (1).

3. The camera according to claim 1, characterized in that, the drive device (2) is a micromotor, an output shaft of the micromotor is fixedly mounted with the output gear (21).

4. The camera according to claim 1, characterized in that, the elastic guide rail (7) is an elastic strip wire including a line segment (71) and curved sections (72) at two ends, and the curved sections (72) at two ends are fixed onto the front cover (1).

5. The camera according to claim 4, characterized in that, the front cover (1) is provided with two U-shaped grooves (14), the curved sections (72) at two ends of the elastic strip wire are fixed in the two U-shaped grooves (14).

6. The camera according to claim 5, characterized in that, the sliding side (34) is provided with a guide groove, which is in sliding fit with the line segment (71) of the elastic strip wire.

7. The camera according to claim 1, characterized in that, on the sliding seat (3) is further fixedly mounted an upper cover plate (6), the light filters (4, 5) are located between the upper cover plate (6) and the sliding seat (3).

8. The camera according to claim 7, characterized in that, the sliding seat (3) is provided with a clamping slot (33), the upper cover plate (6) is provided with a clamping claw (61) to clamp the clamping slot (33).

* * * * *